United States Patent [19]

Harrison

[11] Patent Number: 4,685,646
[45] Date of Patent: Aug. 11, 1987

[54] MOUNT FOR PICKUP TRUCKS

[76] Inventor: Craig Harrison, 588 James Rd., Lawrenceville, Ga. 30245

[21] Appl. No.: 889,622

[22] Filed: Jul. 28, 1986

[51] Int. Cl.⁴ .............................................. A47B 96/06
[52] U.S. Cl. ............................... 248/225.31; 248/499; 248/503; 410/110
[58] Field of Search ............... 248/225.31, 229, 231.1, 248/231.5, 231.7, 499, 503, 500, 316.1, 316.2; 296/39 R; 410/110, 108, 106, 101; 24/457, 458, 459, 525, 569; 269/246

[56] References Cited

U.S. PATENT DOCUMENTS

| | | | |
|---|---|---|---|
| 1,154,847 | 9/1915 | De Vore | 248/229 |
| 2,461,256 | 2/1949 | Black | 24/569 X |
| 2,934,803 | 5/1960 | Allen | 24/569 X |
| 3,185,509 | 5/1965 | Welsher et al. | 248/229 X |
| 3,351,356 | 11/1967 | Clark et al. | 410/110 |
| 3,841,660 | 10/1974 | Clark | 410/156 |
| 4,191,108 | 3/1980 | Jones | 410/110 |
| 4,396,324 | 8/1983 | Ellis | 410/101 |
| 4,444,371 | 4/1984 | Ragen | 248/225.31 |
| 4,522,326 | 6/1985 | Tuohy | 296/37.6 X |
| 4,531,774 | 7/1985 | Whatley | 296/37.6 |
| 4,540,214 | 9/1985 | Wagner | 296/39 R |
| 4,572,568 | 2/1986 | Kapp et al. | 296/39 R |
| 4,605,978 | 8/1986 | Zeavin | 24/458 X |

Primary Examiner—Ramon O. Ramirez
Attorney, Agent, or Firm—Thomas & Kennedy

[57] ABSTRACT

A mount for use in mounting objects to a side of a pickup truck comprises a clamp adapted to be clamped to a downturned flange of the side, an L-shaped safety bar adapted to be sandwiched between the clamp and flange with a portion overlaying the top of the side, and a bolt adapted to be passed through aligned holes in the clamp and safety bar in fastening the clamp to the flange.

6 Claims, 5 Drawing Figures

4,685,646

MOUNT FOR PICKUP TRUCKS

TECHNICAL FIELD

This invention relates generally to mounts, and particularly to mounts for use in mounting objects upon the sides of the beds of pickup trucks.

BACKGROUND OF THE INVENTION

Pickup trucks today are commonly provided with an open bed located behind the truck cab which is bounded by two side walls, a tailgate and the cab. Such trucks possess general utility in their ability to haul loads of various sizes and configurations. There are situations however where objects are mounted to the bed sides rather than being merely laid open the bed floor. For example, utility boxes are commonly mounted upon the sides of the bed just behind the cab for storing tools and equipment. Tiedown lines are also often tied to the sides of the bed tautly wrapped about loads placed on the bed floor. In other cases poles and stanchions are mounted to the bed sides to support tent-like covers.

Heretofore, as exemplified in U.S. Pat. Nos. 3,841,660, 4,191,108, 4,522,326 and 4,531,774, it has usually been necessary to drill holes in the tops of the side walls of the truck beds in order to provide anchoring means for securing the boxes, tiedown lines and stanchions to the pickup truck sides. This has necessitated substantial amount of effort. In addition, since the formation of such holes is irreversible, whereever they are not used they present an aesthetic eyesore. Furthermore, with time rust tends to form about the holes rendering them even more unattractive. Being permanently located, their versatility is also limited for use in mounting and securing loads of different sizes and configurations and at different locations.

Accordingly, it is seen that a need exists for a mount that may be used in mounting objects to the sides of pickup trucks in an easy and versatile manner and which does not necessitate alterations of the truck body or sides themselves. It is to the provision of such mount therefore that the present invention is primarily directed.

SUMMARY OF THE INVENTION

In one form of the invention a mount is provided for use in mounting objects to pickup truck bed sides of the type that have an upper edge web from which a flange downwardly extends beside a side wall. The mount comprises an outboard piece adapted to be mounted to the outboard side of the flange beneath the web with an upper portion located between the side wall and flange and with a lower portion located below the flange beside the side wall. The mount also comprises an inboard piece adapted to be mounted to the inboard side of the flange and onto the lower portion of the outboard piece. The inboard piece has an upper portion adapted to be mounted to an inboard side of the flange and which is provided with means for securing an object thereto. Both the inboard and outboard pieces have a bolt receiving hole formed in their lower portions. The mount further comprises bolt means adapted to be passed through the bolt receiving holes of the inboard and outboard pieces for securing the inboard and outboard pieces together clamped to the flange.

In another form of the invention, a mount for use in mounting objects securely to the side of a pickup truck bed comprises an outboard piece adapted to be mounted partially within an inverted upper channel top of the bed side, and an inboard piece adapted to be mounted to the outboard piece and clamped to the channel. In one embodiment the inboard piece is formed with an eye in which a stanchion, tiedown cord or other object may be mounted while in another embodiment a threaded stud projects upwardly from the inboard piece. The stud is adapted to extend through a hole in the floor of a utility box mounted upon the truck bed side inside of which box a nut may be threaded upon the stud. The mount further comprises fastening means for fastening the outboard and inboard pieces together clamped to the channel.

In yet another form of the invention a mount for use in mounting objects to pickup truck bed sides comprises a clamp having two members releasibly held together by a bolt with one member formed with a mounting hole or threaded stud for use in securing an object thereto. The mount further comprises an L-shaped safety bar formed with a hole through which the bolt may extend and which is adapted to have one bar leg overlap the top of a bed side to prevent the clamp from being pulled off and another bar leg sandwiched between a dependent flange portion of the side and one of the clamp members.

DETAILED DESCRIPTION

Figure 1:
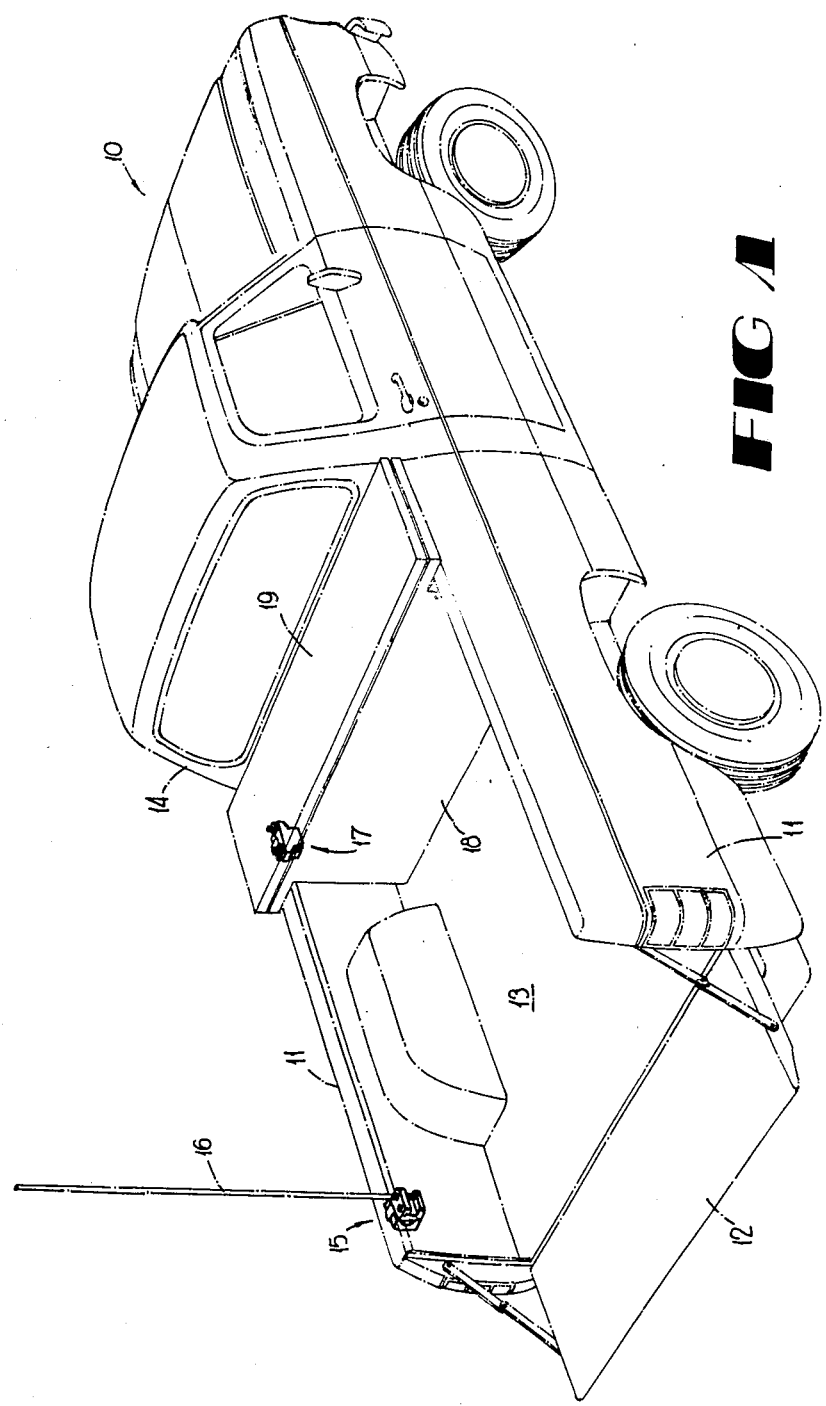
FIG. 1 is a perspective view of two embodiments of the mount of the present invention shown mounted to a side wall about the bed of a pickup truck.

With reference next to the drawing, there is shown in FIG. 1 a pickup truck 10 of conventional configuration having an open bed bounded by two side walls 11, a tailgate 12, a bed floor 13 and the rear of a truck cabin 14. A mount indicated generally at 15 is shown mounted to a rear portion of one side wall supporting an upright stanchion 16. Another mount indicated generally at 17 is shown mounted to a forward end portion of the side wall upon which a utility box 18 is supported. In this application "inboard" is with reference to the truck bed.

Figure 2:
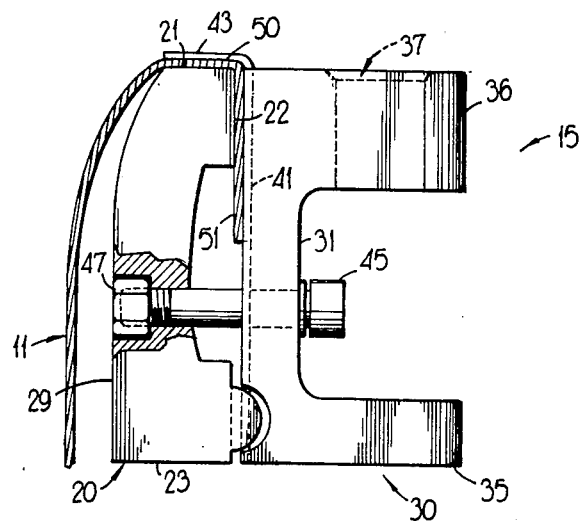
FIG. 2 is an enlarged side view, shown partly in cross section, of one of the mounts shown mounted to a side of a pickup truck.
Figure 3:
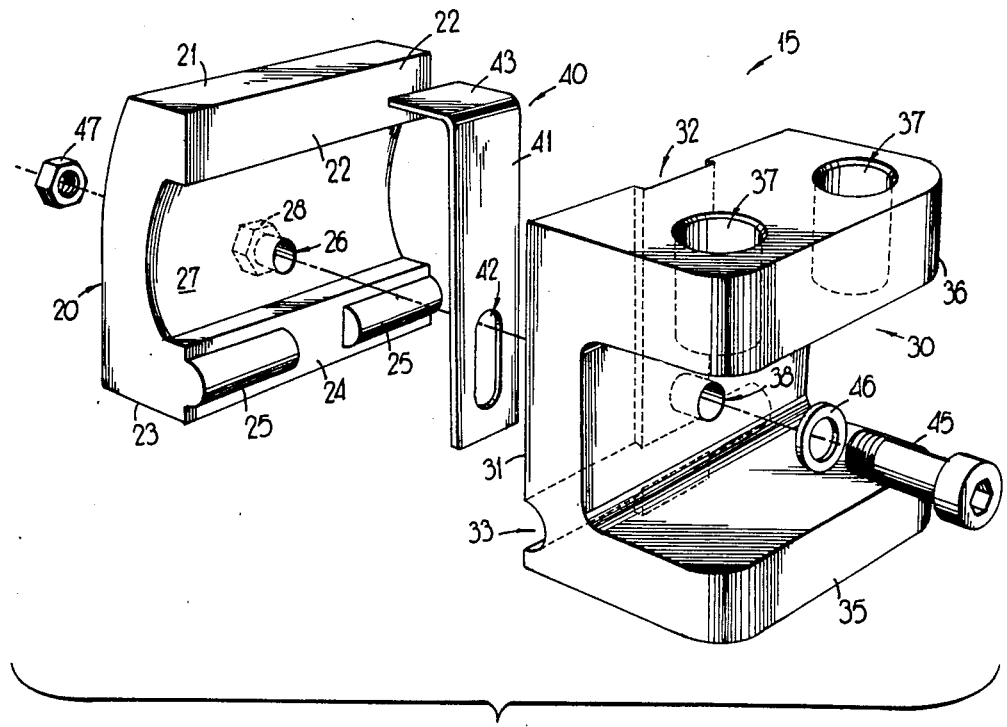
FIG. 3 is an exploded view of the mount illustrated in FIG. 2.

With reference next to FIGS. 2 and 3, the mount 15 is seen to include an outboard piece 20 and an inboard piece 30. An upper portion of the outboard piece 20 is seen to have a flat top 21 that merges right angularly with a flat front face 22. A lower portion of the outboard piece 20 has a flat bottom 23 that merges right angularly with a flat front face 24 upon which is unitarily formed two axially aligned, semi-cylindrical pressure bars 25 that define a gap therebetween. The lower portion of the outboard piece 20 is also formed with a bolt receiving hole indicated generally at 26 that opens to an arcuate front face 27 and which communicates with a hexangularly-shaped, bolt head receiving countersink which opens to a rear face 29.

The inboard piece 30 is of generally C-shaped configuration and has a flat front face 31 which has a shallow, upwardly extending channel 32 formed centrally therein which merges with a semi-cylindrical recess or groove 33 located in a lower portion of the piece. The upper portion of the C-shaped outboard member 30 has an upper arm 36 which is spaced from to overhang a lower arm or pedestal 35 that forms part of a lower portion of the piece. The upper arm 36 is formed with two parallel, cylindrical channels 37 that extend vertically and whose axes straddle that of a bolt receiving hole or channel 38 which extends generally horizontally through a lower portion of the outboard piece beneath the upper arm 36.

The mount 15 is further seen to include an L-shaped safety bar 40 that has an elongated upright leg 41 formed with a slot 42 and a leg 43 that horizonally extends right angularly from the top of the upright section 41. The mount also includes an Allen-head bolt 45, a washer 46 and a hexnut 47.

In use the mount is clamped to the top of a truck side wall 11, as best shown in FIG. 2. The top of the side wall is seen in more detail here to have a flat web 50 at its summit from which a flange 51 downwardly extends beside the side wall 11. Thus, the top of the side is in the general shape of an inverted, U-shaped channel.

In doing this the nut 47 is set in countersink 28 and the top surface 21 of the outboard piece 20 placed flush against the lower surface of the web 50 with the front face 22 placed flush against the inside surface of the downturned flange 51. At this point it should be appreciated that the lower portion of the outbaord piece 20 is located below the lower edge or lip of the flange 51 so as to expose the bolt receiving hole 26 to the truck bed. The front face 31 of the outboard piece 30 is then placed flush against the other side of the flange 51 with the upright leg 41 of the safety bar 40 seated within channel 32 also flush against the flange and its leg 43 placed atop the web 50. The Allen-head bolt 45 is then extended through washer 46, through hole 38 of the outboard member, through slot 42 of the safety bar 40, through hole 26 in the outboard piece 20 and threaded into the nut 47. The bolt is threaded within the nut by the use of an unshown Allen-head wrench inserted into a socket formed in the bolt head. This action draws the two pieces together and brings the pressure bars 25 into seating engagement within the groove 33 straddling the leg 41 of the safety bar. As the radius of the groove 33 is slightly less than that of the pressure bars, a firm mating engagement is encountered thereby distributing pressure laterally along the lower portions of two pieces. The bolt 45 is threaded until a tight fit is made by the pressure bars seated firmly in groove 33 and with the upper portions of the two pieces clamped tightly about the flange 51 with the leg 43 of the safety bar overlaying the web 50.

At this point the mount is held quite securely in place. For example, it may not be manually removed by pulling downwardly on the two pieces in view of the fact that the leg 43 of the safety bar overlays the web 50 at the top of the side wall 11. Thus, any downward movement of the pieces 20 and 30 would be limited by the engagement of bolt 45 with the lower end of the slot 42 in the safety bar. It should also be appreciated that not only is there insufficient room to access the nut 47 manually, but the nut itself cannot be turned in view of its mating configuration within the countersink hole 28. Thus, to remove the mount one must be equipped with an Allen-head wrench of the size matching that of the socket in the head of the bolt 45.

The mount 15 may now be used in several manners. For example, it may be used to support the stanchion 16 as shown in FIG. 1 by merely passing the stanchion downwardly through one of the channels 37 and seating it atop the pedestal 35. A set of such may be secured along the two sides of the pickup truck to support tent poles. Alternatively, tiedown cords may be looped through the channels 37 in typing down equipment set upon the floor of the truck bed.

Figure 4:
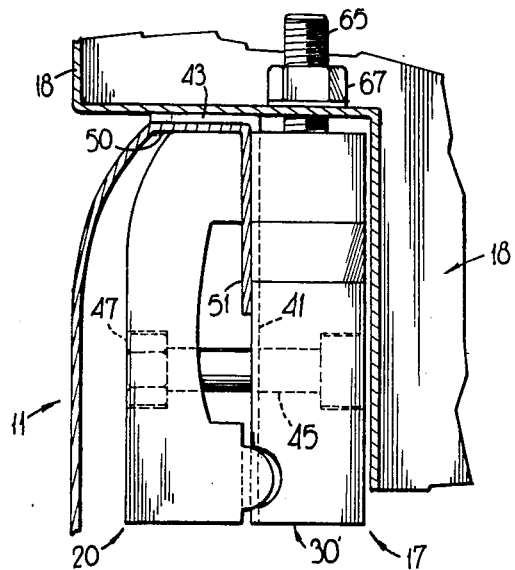
FIG. 4 is an enlarged, side view of the other mount also shown mounted to the side of a pickup truck.
Figure 5:
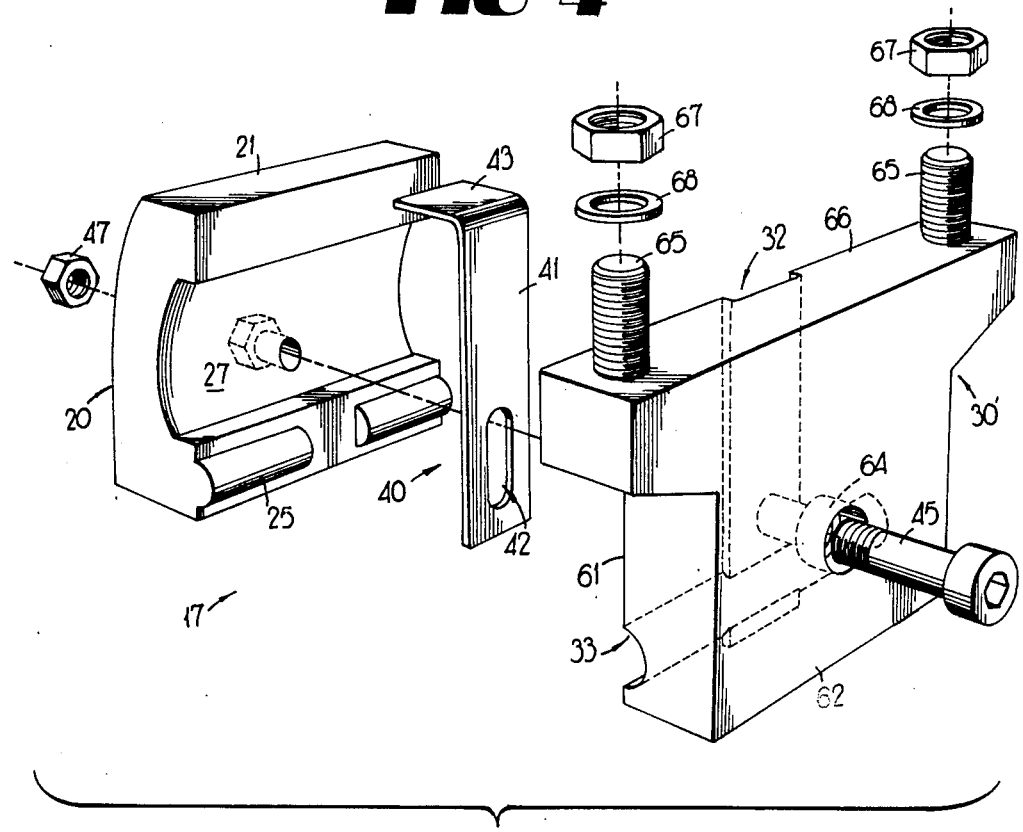
FIG. 5 is an exploded view of the mount illustrated in FIG. 4.

With reference next to FIGS. 4 and 5, the mount 17 is shown in more detail to comprise an outboard piece 20 of the same configuration as that previously described in conjunction with the description of the mount 15. The safety bar 40, bolt 45 and nut 47 are also the same here as in the mount 15. Of different construction however is the inboard piece 30' which here is of a generally block or slab shape rather than C-shaped. The inboard piece 30' has parallel opposed faces 61 and 62 with face 61 being located proximal to the outboard piece 20. The inboard piece 31' is again formed with a semicylindrical groove 33 and a shallow, upright channel 32 which provide the same functions as those previously described. With this embodiment the washer 46 is deleted and a countersink 64 is provided in face 62 to receive the head of bolt 65. The inboard block 30' is also provided with two threaded studs 65 that project upwardly from an upper surface 66. Pairs of nuts 67 and washers 68 are also provided for placement about the studs.

For use a pair of the mounts 17 may be mounted to opposite side walls 11 of the pickup truck 10 just to the rear of the cab 14. Again, each outboard member 20 is placed within the inverted channel top of each side wall while each inboard member 30' is placed flush against the face of the dependent flange 51 with the safety bar nestled within channel 32 and with its upper leg 43 overlaying the web of the side wall. A utility box 18 or the like may then be placed upon the tops of the side walls 11 and the safety bar leg 43 with the two threaded studs 65 extending through holes formed in the bottom of that portion of the box that overlays the side walls. The washers 68 are then placed upon the studs and nuts 67 threaded upon them within the interior of the box with the box lid temporarily raised. The lid may then be lowered and locked thereby restricting access to the box interior and to its contents and nuts 67.

With box 18 so mounted to the pickup truck a high degree of security is provided with respect to tools, equipment and the like stowed within it. For example, there is no access to the mounts since there is insufficient space between the side walls 11 and the outboard pieces 20 to gain access to the nut 47. Again, even if access were obtained the nut would not be able to be rotated in the countersink 28. The Allen-head bolts 45 are also covered by the box which depends down beside and spaced slightly from the side walls 11. In addition, if the box lid is properly closed and locked access is unavailable to the nuts 67 which are threaded upon the studs 65 against the floor of the box. Thus, removal of the mounts may only be had by breaching the lock of the box itself in which its contents would already be rendered insecure.

It thus is seen that a mount is provided for use with pickup trucks that eliminates the need for drilling holes in their side walls. The mounts are of relatively simple construction which may be mounted and dismounted easily while retaining a high degree of security. It should be understood however that the two embodiments described in detail merely illustrate principles of the invention in two preferred forms. Many modifications, additions and deletions may be made thereto without departure from the spirit and scope of the invention as set forth in the following claims.

What is claimed is:

1. A mount for use in mounting an object to a pickup truck bed side of the type that has an upper edge web from which a flange downwardly extends beside a side wall, and with the mount comprising an outboard piece adapted to be mounted to the outboard side of the flange beneath the web with an upper portion of the piece located between the side wall and flange and with a lower portion located below the flange and formed with a bolt receiving hole, and an inboard piece adapted to be mounted to the inboard side of the flange and to a lower portion of the outboard piece, said inboard piece having an upper portion adapted to be mounted to an inboard side of the flange and provided with means for securing an object thereto and a lower portion formed with an inboard bolt receiving hole, bolt means adapted to be passed through said inboard and outboard bolt receiving holes in securing the inboard and outboard pieces together clamped to the flange, and wherein said outboard piece lower portion is formed with an elongated convex protuberance beneath said outboard bolt receiving hole and wherein said inboard piece lower portion is formed with an elongated concave recess below said inboard bolt receiving hole configured to receive said outboard piece convex protuberance in pressure distribution engagement.

2. A mount for use in mounting an object to a pickup truck bed side of the type that has an upper edge web from which a flange downwardly extends beside a side wall, and with the mount comprising an outboard piece adapted to be mounted to the outboard side of the flange beneath the web with an upper portion of the piece located between the side wall and flange and with a lower portion located below the flange and formed with a bolt receiving hole, and an inboard piece adapted to be mounted to the inboard side of the flange and to a lower portion of the outboard piece, said inboard piece having an upper portion adapted to be mounted to an inboard side of the flange and provide with means for securing an object thereto and a lower portion formed with an inboard bolt receiving hole that communicates with a nut configured countersink in a side distal said inboard piece, and bolt means adapted to be passed through said inboard and outboard bolt receiving holes in securing the inboard and outboard pieces together clamped to the flange.

3. A mount for use in mounting an object to a pickup truck bed side of the type that has an upper edge web from which a flange downwardly extends beside a side wall, and with the mount comprising an outboard piece adapted to be mounted to the outboard side of the flange beneath the web with an upper portion of the piece located between the side wall and flange and with a lower portion located below the flange and formed with a bolt receiving hole, and an inboard piece adapted to be mounted to the inboard side of the flange and to a lower portion of the outboard piece, said inboard piece having an upper portion adapted to be mounted to an inboard side of the flange and provided with means for securing an object thereto and a lower portion formed with an inboard bolt receiving hole, said inboard piece being generally C-shaped to have mutually spaced upper and lower arms conjoined by a trunk, and with said upper arm formed with at least one channel extending therethrough whereby a tiedown cord may be looped through the channel or stanchion, pole or the like extended through the channel and its lower end supported atop the lower arm, and bolt means adapted to be passed through said inboard and outboard bolt receiving holes in securing the inboard and outboard pieces together clamped to the flange.

4. A mount for use in mounting objects securely to a side of a pickup truck bed and with the mount comprising an outboard piece adapted to be mounted partially within an inverted channel-shaped top of the bed side and an inboard piece adapted to be mounted to the outboard piece and clamped to the side top, said inboard piece being formed with an eye in which a stanchion, tiedown cord or other object may be secured, fastening means for releasibly fastening said outboard and inboard pieces together beneath the channel-shaped side top, and wherein one of said pieces is formed with an elongated pressure distribution bar and the other piece is formed with an elongated groove sized to receive said pressure distribution bar.

5. A mount for use in mounting objects securely to a side of a pickup truck bed and with the mount comprising an outboard piece adapted to be mounted partially within an inverted channel-shaped top of the bed side and an inboard piece adapted to be mounted to the outboard piece and clamped to the inverted channel-shaped side top, wherein one of said pieces is formed with an elongated pressure distribution and the other of said pieces is formed with an elongated groove sized to receive said pressure distribution bar, a threaded stud projecting upwardly from said inboard piece adapted to be extended through a hole in the floor of a utility box mounted upon the truck bed side top and a nut adapted to be threaded onto the stud within the utility box, and fastening means for releasibly fastening said outboard and inboard pieces together beneath the channel-shaped side top.

6. A mount for use in mounting a utility box securely to a side of a pickup truck bed of the type that has an inverted channel-shaped side top that has a flange that depends downwardly from a channel web, and with the mount comprising an outboard piece adapted to be mounted partially within the channel-shaped side top with a lower portion located beneath the flange, an inboard piece adapted to be mounted directly to the outboard piece lower portion and to the flange, a threaded stud projecting upwardly from said inboard piece adapted to be extended through a hole in the floor of a utility box mounted upon the truck bed side top, a nut adapted to be threaded onto the stud within the utility box, and fastening means for releasibly fastening said outboard and inboard pieces together beneath the side top flange that includes a bolt receiving hole formed in said outboard piece lower portion, a hole formed in said outboard piece and a bolt adapted to be inserted into said bolt receiving holes beneath the flange.

* * * * *